United States Patent [19]

Keenan

[11] Patent Number: 5,029,411
[45] Date of Patent: Jul. 9, 1991

[54] FLEA COLLECTING APPARATUS

[76] Inventor: F. Edward Keenan, 2185 Tierra Verde Rd., Vista, Calif. 92084

[21] Appl. No.: 516,091

[22] Filed: Apr. 27, 1990

[51] Int. Cl.$^5$ .............................................. A01M 5/02
[52] U.S. Cl. ........................................ 43/136; 43/116
[58] Field of Search ................. 43/136, 133, 134, 135, 43/137, 114, 116; 119/87, 91, 86, 88

[56] References Cited

U.S. PATENT DOCUMENTS

| 787,037 | 4/1905 | Hackett | 119/87 |
|---|---|---|---|
| 4,052,811 | 10/1977 | Shuster | 43/116 |
| 4,425,733 | 1/1984 | Ammon | 43/115 |
| 4,599,823 | 7/1986 | Lee | 119/91 |
| 4,815,232 | 3/1989 | Rawski | 43/136 |

Primary Examiner—Richard K. Seidel
Assistant Examiner—Chuck Y. Mah
Attorney, Agent, or Firm—Henri J. A. Charmasson

[57] ABSTRACT

A yellow-colored plate coated with a tacky substance is mounted above and below the teeth of a rake or between rollers and passed over an area infested by fleas or other insect pests. The vibrations and motion caused by the movement of the teeth or the rollers against the supporting surface excite and attract the insects which jump toward the brightly colored plate where they become entrapped into the tacky substance. The apparatus may be used to either determine the nature and extent of the infestation prior to treatment, or to actually clear areas of infestation.

11 Claims, 1 Drawing Sheet

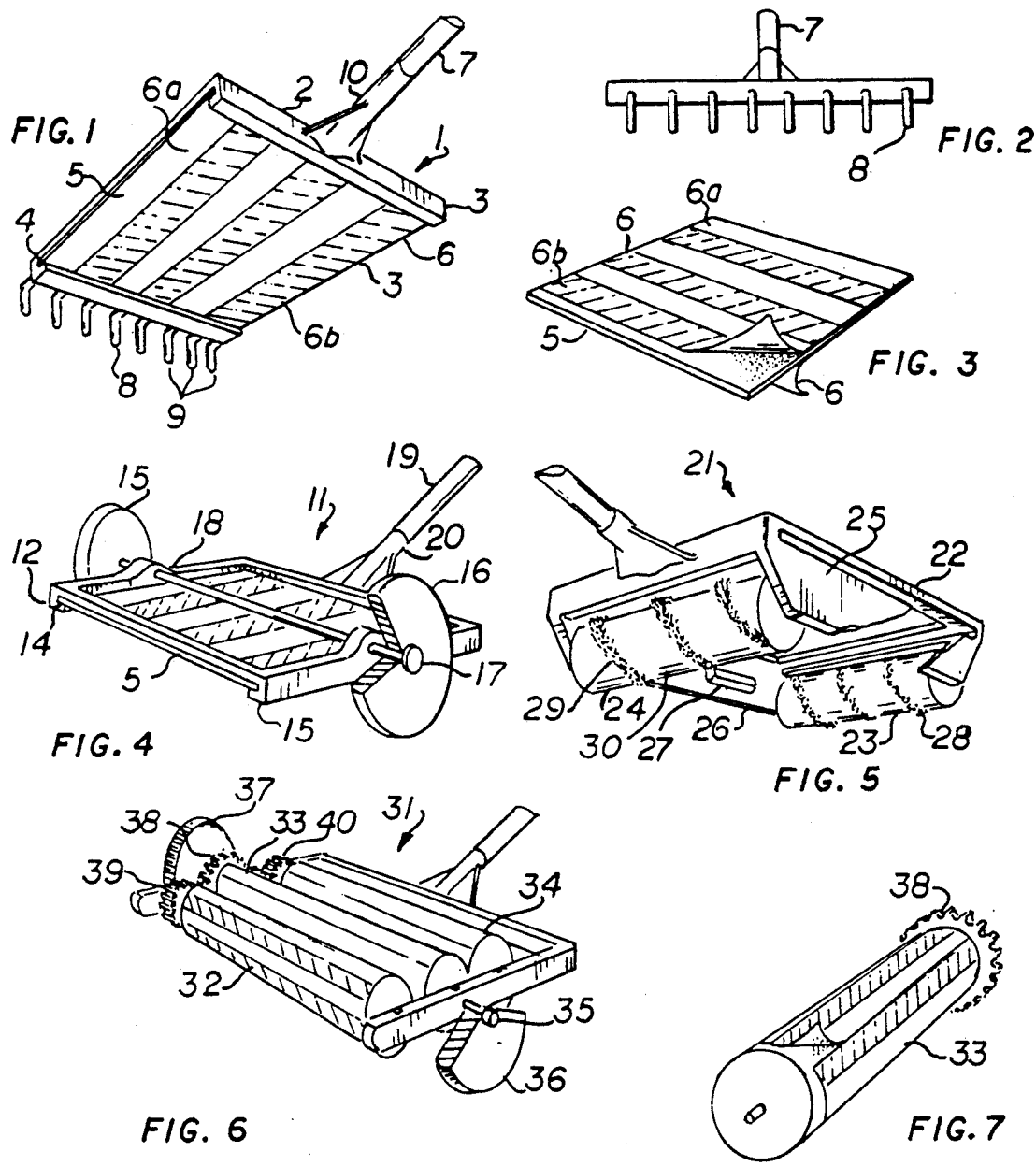

FLEA COLLECTING APPARATUS

BACKGROUND OF THE INVENTION

This invention relates to the prevention, identification and control of insect pests and parasites, and more specifically to the non-toxic extermination of fleas and similar jumping insects.

The cat flea, the dog flea, and the human flea have been a scourge since the dawn of humanity. Not only can they cause unbearable discomfort to both humans and animals, they also carry diseases including bubonic plague still endemic in many parts of the United States. Flea control is commonly achieved by chemical products whose toxicity can have adverse consequences not only on individuals affected with allergies, but also on the entire environment. Man is beginning to learn some bitter lessons from excessive use of DDT, chlorodane and numerous other pesticides in the control of fleas and other insects in previous decades, and also from the high toxicity of sites where domestic and industrial wastes have been dumped. Yet there is no effective non-toxic means to control flea infestations. It is therefore imperative to avoid any abuse of pesticides and to use them only when, and to the extent necessary. Due to the ubiquitous character of fleas, people tend to impute to them any bite or other suspicious redness of the skin. Pesticides are often sprayed indiscriminately to vast areas, often far beyond what would be necessary to eliminate the culprit.

Pest control personnel called in to treat an allegedly infested area have no practical means to collect samples of the suspected pest in order to determine their proper identity and extent of infestation. They end up spraying indiscriminately with highly toxic substances formulated to kill a broad spectrum of insects, when in fact a limited application of a more specific and/or benign chemical would have sufficed.

SUMMARY OF THE INVENTION

The instant invention addresses the problem presented by an indiscriminate and widespread use of highly toxic pesticides in our environment for the treatment of bug infested living areas by providing a means of prevention as well as for collecting and properly identifying specimens of the offending insect, and thus limiting treatment to specific pest and affected areas. It also provides a non-toxic means for mechanically removing fleas and other similar pests from floor coverings and other living areas in which they most often dwell.

This is accomplished by an apparatus that runs a surface covered with a tacky substance in close proximity to the infested area and relies on the sensitivity of fleas to vibration and attraction to light to cause them to jump and get entangled in the tacky substance.

BRIEF DESCRIPTION OF THE DRAWING

FIG. 1 is a perspective view of a first embodiment of the invention in the form of a collecting rake;

FIG. 2 is a front elevational view thereof;

FIG. 3 is a perspective view of the flea collecting plate;

FIG. 4 is a perspective view of a second embodiment of the invention in the form of a rolling tray;

FIG. 5 is a perspective view of a third embodiment of the invention in the form of an illuminated carriage;

FIG. 6 is a perspective view of a fourth embodiment of the invention in the form of a rolling carriage with three collecting rollers; and FIG. 7 is a perspective view of a collecting roller.

DESCRIPTION OF THE PREFERRED EMBODIMENT OF THE INVENTION

Referring now to the drawing, there is shown in FIGS. 1 and 2 a hand-tool 1 particularly adapted for collecting specimens of fleas and other similar pests dislodged from a carpet or other similar type of floor covering. The tool comprises a main body 2 forming a tray supported on two opposite sides by a flange 3 which forms parallel slots 4 shaped and sized to receive the collecting plate 5 illustrated in FIG. 3. The plate is formed by a planar, quadrangular section of rigid material such as cardboard, plastic or the like on the top and bottom surfaces of which has been glued a preferably multi-colored sheet 6 of fabric or paper which has been coated with a tacky substance of the type used on so-called flypapers and glue-board trays. Each sheet 6 comprises alternating strips of bright yellow 6a and darker blue 6b colors. When the section, or plate 5 is inserted through the slot 4, the tool can be manipulated by its long handle 7 which extends obliquely from one side of the tray. The row of teeth 8 which extends downwardly from the side of the tray opposite the handle 7 are intended to contact the floor covering in a back and forth raking movement. Tips 9 of the teeth 8 are purposely rounded to avoid damaging the floor covering, and to facilitate the raking movement. When a flea, or other attracted insect pests present in the carpet is excited by the vibrating movement of the teeth 8 against the carpet, and attracted by the colored sheet 6 it will jump and become embedded in the tacky substance covering the sheet 6. Certain insects such as fleas are known to be attracted by a bright yellow color; other insects respond to the color blue. The attraction of the plate 6 may be greatly enhanced by the addition of a pheromonal composition to the tacky substance. The gusseted socket 10 which mounts the handle 7 is designed to accept the distal tip of common broomstick. It should be noted that the teeth 8 could be replaced by clumps of bristles which could sweep and throw toward the plate 5, not only insects, but also their larvae and eggs.

The second embodiment of the invention 11 illustrated in FIG. 4 comprises a similar tray 12 with flange 13 and slot 14 which mounts the same collecting plate 5. The tray is supported by a pair of wheels 15, 17 mounted on opposite ends of an axle 17 passing through a bearing 18 in the middle of the back area of the tray 12. The handle 19 and mounting bracket 20 are similar to those of the first embodiment. The motion and vibrations necessary to excite and attract the fleas are imparted by the movement of the wheels.

In the third embodiment of the invention 21 illustrated in FIG. 5, the slotted tray 22 is supported by a pair of front and back rollers 23, 24. The rollers are mounted between sides 25, 26 extending downwardly from the lateral edges of the tray. A small light 27 mounted against the inside of one of the lateral walls 25, 26 provides additional illumination to the colored sides of the collecting plates not shown in this figure. The peripheral surfaces 28, 29 of the rollers may be covered with bristles 30 to better agitate the treads of carpeting. In order to better illuminate both sides of the plates 5, it is preferably made of a transparent or translucent material.

The fourth embodiment of the invention 31 illustrated in FIG. 6 follows the same basic design as the second embodiment illustrated in FIG. 4, but provides an expanded collecting surface. Instead of using the plate 5, the collecting element is constituted by three parallel cylinders 32, 33, and 34 on the peripheral surfaces of which have been bonded colored sheets of paper or fabric coated with the tacky surface as better illustrated in FIG. 7. The central cylinder 33 is coaxial with the axle 35 of the supporting wheels 36 and 37, and thus driven by the movement of the wheels. The spur-gear 38 at the end of the central cylinder 33 is coupled to spur-gears 39 and 40 respectively associated with the front and back cylinders 32 and 34. As the device is rolled over a carpet, the three cylinders rotate slowly exposing a much larger collecting surface to the carpet or floor than would be exposed by the previous embodiments.

Thus when the presence of fleas or other insect pests is suspected on the premises, either one of the four embodiments of the invention just described can be passed over the suspected infested area in order to verify the presence and nature of the pests. As the floor is vibrated by the raking or rolling motion of the device fleas, if any are present, will be excited by the vibrations and attracted by the colored sheet of the collecting plate. They will jump and become entrapped in the tacky material. Once the presence, identification and extent of the infestation has been determined, proper treatment can be applied, limited to the infested area. The dark strips 6b on the collecting plate offer a contrasting background for the detection and identification of light-colored eggs, larvae and insects; while the light-colored strip 6a facilitates the detection and identification of darker-colored species. In many cases, repeated passage of the device over the infested area is all that will be necessary to rid the area of the infestation, thus preventing an outbreak.

While the preferred embodiments of the invention have been described, modifications can be made and other embodiments may be devised without departing from the spirit of the invention and the scope of the appended claims.

What is claimed is:

1. A device for collecting fleas and other insect pests from floors, floor coverings, furs, upholstery, lawns and similar infested areas which comprises:
   a collecting body having a planar frame integral with said body, and a sheet coated with a tacky material mounted within said frame; and
   means for passing said sheet at a short distance over said areas, comprising a handle attached to said collecting body, and at least one spacing member projecting from said body for riding against said area; wherein said spacing member comprise at least one rotating support.

2. The device of claim 1, wherein said rotating support comprises a pair of wheels mounted on said body.

3. The device of claim 1, wherein said rotating support comprises at least one roller.

4. A device for collecting fleas and other insect pests from floors, floor coverings, furs, upholstery, lawns and similar infested areas which comprises:
   a collecting body having a planar frame integral with said body, and a sheet coated with a tacky material mounted within said frame; and
   means for passing said sheet at a short distance over said areas, comprising a handle attached to said collecting body, and at least one spacing member projecting from said body for riding against said area;
   wherein said collecting body comprises means for illuminating said sheet.

5. The device of claim 4, wherein said means for illuminating comprises a plate made of light-conducting material.

6. A device for collecting fleas and other insect pests from floors, floor coverings, furs, upholstery, lawns and similar infested areas which comprises:
   a collecting body comprising at least one cylinder coated over its peripheral surface with a tacky surface; and
   means for axially rotating said cylinder;
   a handle attached to said collecting body; and
   at least one spacing member projecting from said body riding against said areas.

7. The device of claim 6, wherein said spacing members comprise a pair of wheels; and
   means for coupling said wheels to said cylinder.

8. A device for collecting fleas and other insect pests from a ground surface which comprises:
   a substantially planar tray having a collecting face coated with a substance sufficiently tacky to trap insects that come in contact therewith;
   a handle extending from a first side of the tray; and
   a scraping rake comprising a plurality of widely spaced-apart projections extending from a second side of the tray away from said face and into contact with said surface;
   wherein said handle comprises a pole substantially commensurate with an ordinary broomstick; and
   said collecting face is oriented in relation to said projections to face and pass a short distance over said surface when said device is manipulated as a rake by means of said handle over said surface; and
   means for illuminating said collecting face.

9. A device for collecting fleas and other insect pests from a ground surface which comprises:
   a substantially planar tray having a collecting face coated with a substance sufficiently tacky to trap insects that come in contact therewith;
   a handle extending from a first side of the tray; and
   a scraping rake comprising a plurality of widely spaced-apart projections extending from a second side of the tray away from said face and into contact with said surface;
   said handle comprises a pole substantially commensurate with an ordinary broomstick, and
   said collecting face is oriented in relation to said projections to face and pass a short distance over said surface when said device is manipulated as a rake by means of said handle over said surface; and
   a heat source proximate to said collection plate.

10. The device of claim 9, wherein said heat source consists in a light.

11. A device for collecting fleas and other insect pests from a ground surface which comprises:
    a substantially planar tray having a collecting face coated with a substance sufficiently tacky to trap insects that come in contact therewith;
    a handle extending from a first side of the tray; and
    a scraping rake comprising a plurality of widely spaced-apart projections extending from a second side of the tray away from said face and into contact with said surface;
    wherein said face comprises at least one light colored area and at least one dark colored area.

* * * * *